(12) United States Patent
Reusser et al.

(10) Patent No.: US 9,708,005 B2
(45) Date of Patent: Jul. 18, 2017

(54) INCLINATION-ENABLING WHEEL SUSPENSION FOR VEHICLES

(71) Applicant: vonRoll infratec (investment) ag, Zug (CH)

(72) Inventors: Rino Reusser, Biel (CH); Raphael Voisard, Courtedoux (CH); Stefan Kayser, Grenchen (CH)

(73) Assignee: VONROLL INFRATEC (INVESTMENT) AG, Zug (CH)

( * ) Notice: Subject to any disclaimer, the term of this patent is extended or adjusted under 35 U.S.C. 154(b) by 0 days.

(21) Appl. No.: 14/926,667

(22) Filed: Oct. 29, 2015

(65) Prior Publication Data

US 2016/0121687 A1 May 5, 2016

(30) Foreign Application Priority Data

Oct. 31, 2014 (CH) ...................... 1672/14

(51) Int. Cl.
*B62D 61/06* (2006.01)
*B60G 3/14* (2006.01)
(Continued)

(52) U.S. Cl.
CPC .......... *B62D 21/11* (2013.01); *B60G 17/0162* (2013.01); *B60G 21/007* (2013.01); *B60G 21/073* (2013.01); *B62D 61/06* (2013.01); *B62K 5/01* (2013.01); *B62K 5/027* (2013.01); *B62K 5/10* (2013.01); *B60G 3/145* (2013.01); *B60G 2200/132* (2013.01); *B60G 2202/413* (2013.01);
(Continued)

(58) Field of Classification Search
CPC ........ B62D 21/11; B62D 61/08; B62D 61/06; B62D 9/02; B62D 9/04; B60G 21/073; B60G 21/007; B60G 21/06; B60G 21/05; B60G 21/00; B60G 17/0162; B60G 2300/124; B60G 2300/122; B60G 2300/45; B60G 2204/8304; B60G 2204/82; B60G 2204/80; B60G 2800/012; B60G 2200/132; B60G 2200/1322; B60G 2200/1324; B60G 2200/13; B60G 2202/413; B60G 3/14; B60G 3/145; B60G 3/12; B62K 5/027; B62K 5/10; B62K 2005/001
USPC .... 280/124.128, 124.157, 124.158, 124.159, 280/16, 161, 5.509, 5.5, 62, 124.103
See application file for complete search history.

(56) References Cited

U.S. PATENT DOCUMENTS

2010/0032915 A1* 2/2010 Hsu .................... B62H 1/12
280/5.509
2014/0312580 A1* 10/2014 Gale .................... B60G 21/073
280/5.509

FOREIGN PATENT DOCUMENTS

DE 1065328 B 9/1959
DE 4115717 A1 11/1991
(Continued)

OTHER PUBLICATIONS

European Search Report corresponding to Application No. 15191558.4-1755/3015296 published on Jun. 8, 2016.

*Primary Examiner* — Keith J Frisby
(74) *Attorney, Agent, or Firm* — Notaro, Michalos & Zaccaria P.C.

(57) ABSTRACT

A wheel suspension for a vehicle with a supporting vehicle element includes at least one pair of single-sided swing arms. Each single-sided swing arm is associated with a hydraulic cylinder, which is linked to the single-sided swing (Continued)

arm and/or the supporting vehicle element. Each hydraulic cylinder is subdivided in a fluid-tight manner into two chambers.

14 Claims, 10 Drawing Sheets

(51) Int. Cl.
- *B60G 21/073* (2006.01)
- *B62D 21/11* (2006.01)
- *B60G 17/016* (2006.01)
- *B60G 21/00* (2006.01)
- *B62K 5/01* (2013.01)
- *B62K 5/027* (2013.01)
- *B62K 5/10* (2013.01)
- *B62D 9/02* (2006.01)
- *B62D 9/04* (2006.01)
- *B62D 61/08* (2006.01)
- *B62K 5/00* (2013.01)

(52) U.S. Cl.
CPC .......... *B60G 2204/422* (2013.01); *B60G 2204/4605* (2013.01); *B60G 2204/82* (2013.01); *B60G 2204/8304* (2013.01); *B60G 2300/122* (2013.01); *B60G 2300/124* (2013.01); *B60G 2300/45* (2013.01); *B60G 2600/68* (2013.01); *B60G 2800/012* (2013.01); *B62D 9/02* (2013.01); *B62D 9/04* (2013.01); *B62D 61/08* (2013.01); *B62K 2005/001* (2013.01)

(56) References Cited

FOREIGN PATENT DOCUMENTS

| | | |
|---|---|---|
| EP | 0876263 B1 | 12/1999 |
| FR | 2841870 A1 | 1/2004 |
| IT | WO 01/36253 A1 * | 5/2001 ............ B62D 9/02 |
| WO | 2009087595 A1 | 7/2009 |

\* cited by examiner

INCLINATION-ENABLING WHEEL SUSPENSION FOR VEHICLES

The present invention to an inclination-enabling wheel suspension for vehicles, and to a vehicle with such a wheel suspension and a multi-wheeled, especially three-wheeled or four-wheeled, motor vehicle with such a wheel suspension.

Vehicles are known from EP 0 876 263 B1 in which the front wheels and/or the rear wheels are linked via respective wheel suspensions to a chassis of the vehicle in such a way that the vehicle is tiltable in the direction towards the interior of the curve when travelling through a curve. Pairs of single-sided swing arms necessary for this purpose (one pair of single-sided swing arms for the front wheels and/or one pair single-sided swing arms for the rear wheels) allow an oppositely directed movement of the respective wheels in relation to each other. Hydraulic cylinders are respectively assigned to the single-sided swing arms for initiating the oppositely directed swiveling movement, in which a piston is movably inserted. The piston subdivides the cylinder chamber of the respective hydraulic cylinder into two chambers. The respectively mutually assigned chambers of a respective pair of single-sided swing arms are connected to each other via a fluid line.

A fluid such as hydraulic oil that is filled into this closed system transfers a movement of the piston of a first hydraulic cylinder to a movement of the piston of a second hydraulic cylinder in an opposite direction with a substantially equal stroke. If therefore the wheel on the interior of the curve which is linked by a first single-sided swing arm to the chassis is moved in a direction directed upwardly in relation to the vehicle, the wheel on the outside of the curve that is linked to the chassis by a second single-sided swing arm is moved simultaneously in the opposite direction. It is thus ensured that both wheels, even when travelling through curves, remain permanently in ground contact with the road surface. The hydraulic cylinders are respectively linked via their respective ends between the single-sided swing arms and the chassis of the vehicle.

It is known from EP 2 046 589 B1 that the respective chambers (first and second chambers) of the two hydraulic cylinders of a pair of single-sided swing arms can respectively be connected to each other via fluid lines, so that two closed systems are formed. The closed systems are filled with a pressurised fluid such as hydraulic oil, gas etc. It is also known from EP 2 046 589 B1 that only one closed system is provided (for example, only the first chambers of the two hydraulic cylinders of a pair of single-sided swing arms are connected to each other by means of a fluid line). In this example known from the prior art, the respective further chambers (e.g. the second chambers) are then closed. A fluid such as a gas enclosed in these separate chambers act in this case as a buffer or damping of the piston.

It is the object of the present invention to provide an alternative embodiment of the wheel suspension known from the prior art. This object is achieved by the subject matter of the independent claims.

In accordance with the invention, a wheel suspension is provided for a vehicle with a supporting vehicle element. The wheel suspension comprises at least one pair of single-sided swing arms, wherein each of the single-sided swing arms is linked separately to the supporting vehicle element and a wheel is rotatably fastened to the single-sided swing arm, wherein each of the single-sided swing arms is associated with a hydraulic cylinder which is linked to the single-sided swing arm and/or the supporting vehicle element, wherein each hydraulic cylinder is subdivided by a movable piston in a fluid-tight manner into two chambers. Each hydraulic cylinder comprises a first chamber with an active function and a second chamber with a passive function, wherein the active chamber is liquid-filled, wherein the active chambers of a pair of single-sided swing arms communicate with each other via a liquid line in a closed system, by means of which movements of the piston of a first one of the hydraulic cylinders produce respective counter-movements of the piston of a second one of the hydraulic cylinders, and wherein the passive chamber is fluid-filled, wherein the fluid in the passive chamber exerts a force on the rear side of the piston, which substantially corresponds to the force exerted by the pressure of the ambient air and thus influences the positions of the piston insignificantly.

"Supporting vehicle elements" are defined in connection with the present invention as follows:

A "chassis" is a supporting vehicle element formed as a supporting frame structure or as a vehicle chassis.

"Bodywork" is a casing which is carried at least partly by the chassis or which is formed as a supporting vehicle element and which combines the properties of chassis and bodywork as a self-supporting structure.

The chassis can partly comprise casings, and the bodywork can comprise frame structures. The chassis and the casing, or the frame and the bodywork, are movably or immovably connected to each other.

Further components of a vehicle such as the battery, the fuel tank, the engine and the transmission, can also fulfil a supporting function, in that they or their parts are movably or immovably connected to parts of the chassis, the bodywork and/or parts of the wheel suspension.

All supporting vehicle elements such as the chassis, the bodywork, the frame structure and their combinations, and further supported components of a vehicle, will be designated below for reasons of simplicity as a supporting vehicle element. A chassis is shown in all drawings in lieu of all possible and useful combinations of such supporting vehicle elements, which shall not be limiting in any way. A part of a wheel suspension formed as a single-sided swing arm can be formed as a separate component, as a frame structure, as a part of bodywork, or as their combination. A wheel suspension for the front wheels and/or rear wheels of a vehicle further comprises two or rather a pair of single-sided swing arms.

A wheel suspension with hydraulic cylinders is provided which is respectively subdivided into an active chamber and a passive chamber in a fluid-tight manner. The active chambers are liquid-filled and are connected to each other via a liquid line and thus form a closed system. Said closed system of the active chambers can be supplied with excess pressure or negative pressure. As a result, movements of the piston of a first one of the hydraulic cylinders are transferred to respective counter-movements of the pistons of a second one of the hydraulic cylinders in the opposite direction. The passive chambers of the hydraulic cylinders are fluid-filled on the other hand, wherein the fluid does not exert any relevant force on the rear side of the piston. As a result, no influence is made on positions or movements of the pistons on the part of the passive chambers, relating to the respective ambient pressure. Consequently, the pistons of the respective hydraulic cylinders are merely mutually moved or adjusted by the active chambers. Foreign influences on the movement of the pistons are thus advantageously excluded. The movements of the pistons in the respective opposite direction are advantageously precisely synchronous by the into of the liquid medium. Furthermore, the strokes of the pistons in the respective opposite direction are respectively precisely identical. Improved ground contact of the wheels with the road surface is enabled in a vehicle with such a wheel suspension. Furthermore, a reaction of the wheels to unevenness on the road which occurs more rapidly in comparison with the prior art can further be achieved. A more pleasant driving experience is thus generally provided. At the same time, the safety of the vehicle is improved. One advantage of the wheel suspension is the approximately resistance-free inclination about the longitudinal axis projected onto the ground of a vehicle provided with the wheel suspension. A driving experience is thus provided (irrespective of the number of wheels) which is similar to the driving experience for a two-wheeled motorbike.

If the fluid in the passive chambers of the hydraulic cylinders comprises a gas such as air, the hydraulic cylinders preferably respectively comprise an air filter associated with the passive chambers, via which the passive chambers are respectively formed to communicate with the ambient air. Penetration of foreign particles such as dirt, dust etc and liquid such as water into the passive chambers is advantageously prevented in this manner. Disadvantageous impairments to the hydraulic cylinders are thus prevented. Furthermore, this increases the operational lifespan of the hydraulic cylinders. At the same time, pressure exchange between the passive chambers and the pressure of the ambient air is reliably ensured. This prevents any disturbing forces on the piston of one of the respective hydraulic cylinders by excess pressure or a negative pressure for example on the part of a side of the piston facing the passive chamber in relation to the pressure of the ambient air. The movement of the pistons within the hydraulic cylinders is thus free from any disturbing forces and at the same time the passive chambers are protected by the air filters against penetration of foreign particles.

Alternatively and preferably, the wheel suspension comprises a fluid line which is associated with the passive chambers and via which the passive chambers of the hydraulic cylinders of a pair of single-sided swing arms are formed to communicate each other. The respective passive chambers and the fluid line form a pressure-free closed system, so that no disturbing forces act on the pistons. The passive chambers are further sealed against the ambient environment by the fluid line, so that no foreign particles can reach the passive chambers. This closed system is preferably filled with a gas or gas mixture such as air or inert gas. The closed system can alternatively be filled with liquid. Combinations of fluids can also be used. In one case, in which the passive chambers are filled with gas or gas mixture, the fluid line can comprise at least one opening in order to produce pressure compensation with the external pressure. An air filter can be inserted into the opening for example.

The wheel suspension further preferably comprises at least one damping unit, whose input is connected to the liquid line. The damping unit ensures that hydraulic cylinders respectively associated in pairs operate more finely. Furthermore, the damping unit assumes an additional function for vehicle damping. Exemplary damping units comprise diaphragm accumulators.

The wheel suspension further preferably comprises at least one liquid control valve, which is arranged in the liquid line between the active chambers of the hydraulic cylinders and can be triggered for the purpose of controlling the liquid exchange between the active chambers of the hydraulic cylinders of a pair of single-sided swing arms. The interposed liquid control valve allows a controllable exchange of liquid which is adjustable by the opening width of the liquid control valve. Once the liquid control valve is completely closed by respective triggering, the liquid exchange between the active chambers of the hydraulic cylinders of a pair of single-sided swing arms is locked or blocked, so that a movement of the single-sided swing arms is entirely blocked. The inclination of a vehicle associated with the wheel suspension is thus prevented by said blocking. This setting for blocking can be made for example when the vehicle travels at very low speeds, when it is stopped, or when the vehicle is parked. The liquid control valve can be triggered via a motor or manually. This provides a wheel suspension in which the adjustment of the inclination, when travelling through curves, can be set precisely depending on specific conditions, e.g. depending on the current velocity of the vehicle or the respective angle of inclination of the vehicle, by motive triggering of the liquid control valve. The liquid control valve can be a valve that can be triggered electrically such as a solenoid or electromagnetic valve. The liquid control valve can be triggered by a stepper motor. Alternatively or additionally, these settings can also be made manually.

Preferably, the at least one liquid control valve is formed to control (e.g. to reduce or to open) a liquid exchange between the active chambers of the hydraulic cylinders of a pair of singled-sided swing arms with increasing extension of the piston into the cylinder chamber or out of said chamber according to a selectable functional curve, e.g. progressively. In this case, the liquid control valve is triggered in such a way that the inclination characteristics of the vehicle are adjusted individually according to the selectable or a predetermined functional curve. The liquid control valve can be triggered in such a way for example that towards the inclination limit of the vehicle (maximum inclination) the liquid line closes according to the selectable functional curve (e.g. progressively), through which the liquid exchange between the active chambers is reduced. This triggering leads to the consequence that that the inclination of the vehicle is slowed down towards the inclination limit of the vehicle. In the opposite direction on the other hand, i.e. the direction for righting the vehicle from the inclined position, the liquid control valve can be opened or even fully opened in order to thus ensure rapid and reliable righting of the vehicle. In other words, it can additionally be provided that the at least one liquid control valve is opened entirely once the vehicle is righted. This ensures safe travelling properties of the vehicle especially when travelling through curves.

The wheel suspension preferably comprises at least two damping units, whose inputs are respectively connected to the liquid line on a section thereof between the respectively active chambers of the hydraulic cylinders and the liquid control valve. In the case of an interposed liquid control valve, a first damping unit can be connected to the liquid control line extending between the liquid control valve and the first hydraulic cylinder, and a second damping unit can be connected to the liquid line extending between the liquid control valve and the second hydraulic cylinder. By providing one respective damping unit on both sections of the liquid line, the two hydraulic cylinders can operate in a very fine manner irrespective of the opening width of the liquid control valve, and at the same time can generally assume a function for damping the wheel suspension. This arrangement ensures a reliable function of the individual damping on both single-sided swing arms of a pair of singled-sided swing arms, even in the case of blocked inclination, i.e. in a closed state of the liquid control valve.

The wheel suspension preferably further comprises a number (i.e. one or several) of mechanical brakes which are respectively arranged between the supporting vehicle element and the single-sided swing arms in such a way that a swiveling movement of the single-sided swing arms is braked, blocked or released in relation to the supporting vehicle element. In this embodiment, the active chambers of the hydraulic cylinders of a pair of singled-sided swing arms can be directly connected to each other without the aforementioned liquid control valve. The triggering of the inclination of the vehicle by the wheel suspension occurs in this case by the mechanical brakes. This ensures further reliably adjustable inclination characteristics of the vehicle.

The mechanical brakes are preferably respectively associated with a hydraulic cylinder and can be triggered for the purpose of braking, blocking or releasing a movement of the piston rod of the piston in relation to the cylinder. As a result, the respective stroke of a respective piston can be controlled reliably in a range between blocking, release and complete release.

The wheel suspension further preferably comprises a number (i.e. one or several) of spring element(s), wherein at least one respective spring element is arranged and formed between the supporting vehicle element and the single-sided swing arms in such a way that a restoring force is applied between the supporting vehicle element and the respective single-sided swing arms. The respective spring elements are arranged in such a way that they counteract the inclination of the vehicle in a region of maximum inclination of the vehicle and support renewed righting of the vehicle by respective action of force. For this purpose, a respective one of the number of spring elements can be inserted at least in sections on a section of the piston rod of the respective hydraulic cylinder which extends outside of the cylinder. In the case of an inclination of the vehicle in the region of a maximum inclination, the spring element applies a restoring force between the cylinder of the respective hydraulic cylinder and the single-sided swing arm which is linked thereto. Said restoring force counteracts a force for the further inward pivoting of the single-sided swing arm in relation to the supporting vehicle element (inclination of the vehicle) and further supports righting of the vehicle. In a further example, the respective spring elements, in a case in which the hydraulic cylinder permits under pressure load an inward pivoting of a respectively linked single-sided swing arm in relation to the supporting vehicle element, can be arranged at least in sections within the active chamber of a respective hydraulic cylinder. Alternatively, the respective spring elements, in a case in which the hydraulic cylinder permits an inward pivoting of a respectively linked single-sided swing arm in relation to the supporting vehicle element under tensile loading, can be arranged at least in sections within the passive chamber of a respective hydraulic cylinder. In a further example, one of the number of spring elements is arranged separately from a respective hydraulic cylinder between the supporting vehicle element and the respective single-sided swing arm. The respective spring elements can be formed as a mechanical spring or as a gas spring for example. More than one respective spring element can also be provided per hydraulic cylinder. For example, two or more spring elements can be provided per hydraulic cylinder, which spring elements have a different spring constant. Consequently, the respective springs with a lower spring constant can apply a light reverse restoring force between the single-sided swing arm and the supporting vehicle element, whereas springs with a higher spring constant, in the case of a progressive inclination of the vehicle, can apply a greater reverse restoring force between them. As a result, a reverse restoring force with progressive properties is collectively applied.

The wheel suspension preferably further comprises a number of shock absorbers, wherein preferably at least one shock absorber is associated with a single-sided swing arm (or alternatively both single-sided swing arms), wherein the shock absorber or the shock absorbers are respectively connected to the supporting vehicle element and/or the single-sided swing arms. The shock absorbers absorb and dampen shocks applied to the respective single-sided swing arms. The driving comfort of the vehicle is thus further improved. Furthermore, a further improved ground contact between the wheels that are rotatably mounted on the single-sided swing arms and the ground can be ensured. This improves safety of the vehicle even in the case of unfavourable road paving conditions.

In a further embodiment, the wheel suspension comprises a number of lever elements, wherein a lever element respectively associated with a single-sided swing arm is pivotably attached to the supporting vehicle element and whose sections are respectively connected to the shock absorber and/or the hydraulic cylinder. In this embodiment, the hydraulic cylinders are respectively connected between a respective single-sided swing arm and a first end of the lever element. Furthermore, the shock absorbers are respectively connected between the supporting vehicle element of the vehicle and a second end of the lever element. The two ends of the lever element are situated opposite to each other via a pivot point of the lever element. This ensures that shocks on the respective single-sided swing arm are reliably absorbed and dampened irrespective of the inclination of said single-sided swing arm in relation to the supporting vehicle element (inclination of the vehicle when travelling through curves). For example, the shock absorbers are respectively connected to the supporting vehicle element and a section of the lever element, and the hydraulic cylinders are respectively connected to the single-sided swing arm and a further section of the lever element. This ensures increased driving comfort even when travelling through curves. The increased ground contact further increases security against the vehicle breaking away when travelling through curves between the wheels and the road surface. In a further alternative example, the shock absorbers are respectively connected to the single-sided swing arm and a section of the lever element, and the hydraulic cylinders are respectively connected to the supporting vehicle element and a further section of the lever element. Alternatively, the shock absorber and the hydraulic cylinders of a respectively associated single-sided swing arm are preferably serially connected to each other. Shocks on the wheels can be absorbed reliably by the serial arrangement.

Preferably, the shock absorbers and the hydraulic cylinders of a respectively associated single-sided swing arm are rigidly connected to each other. In this case, the hydraulic cylinders are respectively linked to the single-sided swing arms and the shock absorbers are respectively linked to the supporting vehicle element. Furthermore, the hydraulic cylinders and the shock absorbers are (rigidly) connected to each other at their other ends. It is understood that the hydraulic cylinders and the shock absorbers can be switched in their arrangement. As a result of this arrangement, the single-sided swing arms are precisely deflected by means of the hydraulic cylinders, respectively according to the inclination of the vehicle. Furthermore, shocks on the wheels are reliably absorbed by serially connected shock absorbers.

Alternatively, the shock absorbers and the hydraulic cylinders of a respectively associated single-sided swing arm are pivotably linked to each other via a common pivot point, wherein further a strut is comprised which is linked between the common pivot point and the supporting vehicle element. In this case, the hydraulic cylinders and the shock absorbers which are respectively associated in pairs are not rigidly connected to each other but are pivotably linked to each other. The struts are respectively linked to the hinge point or pivot point. The further ends of the respective struts are linked to the supporting vehicle element. It is preferable in this respect that the respective pivoting axes between the supporting vehicle element and the struts and the respective pivoting axes between the supporting vehicle element and the linked single-sided swing arms extend along a common line or axis. If it is required that the shock absorbers and the hydraulic cylinders function independently from each other, the pivoting axes between the supporting vehicle element and the struts and the respective pivoting axes between the supporting vehicle element and the linked single-sided swing arms must extend along the common axis. As a result, the hydraulic cylinders can operate in an especially fine way and shocks on the wheels are simultaneously reliably absorbed.

Alternatively, the shock absorbers and the hydraulic cylinders of a respectively associated single-sided swing arm are preferably arranged and connected to each other in an overlapped manner in the longitudinal direction preferably in sections; a rigid connection is preferred in this case. The shock absorbers are therefore linked to the supporting vehicle element and rigidly connected at their further ends to the respective hydraulic cylinders. It is understood that the hydraulic cylinders and shock absorbers can be switched in their arrangement. The shock absorbers and the respective hydraulic cylinders can be connected to each other via a component. The component can be fixed to an outer circumference of a cylinder chamber or comprise the hydraulic cylinder and a portion of the shock absorber. The piston rods of the respective hydraulic cylinder can extend through apertures respectively introduced into the components. The ends of the piston rods are linked to the single-sided swing arms. The axes of the hydraulic cylinders and the shock absorbers thus extend in parallel with respect to each other. This prevents impairment to their work, so that the hydraulic cylinders will continue to operate in a fine way and the shock absorbers will reliably absorb shocks. In this embodiment, a more compact configuration of the wheel suspension is achieved as a result of the arrangement between the hydraulic cylinder and the shock absorber which is preferably overlapped in sections. Consequently, the extension of the arrangement of hydraulic cylinder and shock absorber is reduced by the length of the cylinder chamber in the longitudinal direction, thus providing the wheel suspension with a compact configuration. A deflection of the single-sided swing arms can be achieved which is generally greater because hydraulic cylinders of a generally increased extension can be used. It is understood that the hydraulic cylinders and the shock absorbers can be exchanged in their arrangement. Alternatively or additionally, the spring/damping path of the shock absorbers can be increased so that a more convenient damping of the vehicle is achieved.

Preferably, the single-sided swing arms respectively associated with a hydraulic cylinder can be deflected in the opposite direction upon pressure or tensile loading of the active chamber of the respective hydraulic cylinder. Since the respectively active chamber of a hydraulic cylinder can be loaded under pressure or tension, or excess pressure or negative pressure—respectively in relation to the pressure of the ambient air, a high degree of freedom in the design of the wheel suspension is ensured. This also grants a greater design freedom in the design and the development of the vehicle.

The aforementioned object is further achieved by a vehicle with a wheel suspension, formed for inclining in the direction towards the interior of the curve when travelling through curves. The vehicle in accordance with the invention can be inclined reliably in the direction towards the interior of the curve when travelling through curves, so that curves can be travelled by the vehicle even at high velocity. Furthermore, reliable ground contact between the wheels and the road surface is ensured at all times by the vehicle. The vehicle thus also meets high safety requirements. The vehicle can be any vehicle which is driven or drawn by gravity and/or an electric motor and/or an internal combustion engine and/or by muscle power. The number of the wheels of the vehicle is not limited, but such a vehicle preferably comprises three or four wheels.

The vehicle further preferably comprises at least one acceleration sensor, formed for detecting the orientation of a G-load on the vehicle, i.e. the direction of the resulting vector of the current G-load. The vehicle preferably further comprises a control device, which is coupled to the at least one acceleration sensor and which compares the spatial position of the resulting vector of the current G-load with the position and inclination of the vehicle. Said control device is preferably operatively connected to the liquid control valve in order to adjust the degree of opening of said control valve on the basis of the comparison of the spatial position of the resulting vector of the current G-load with the position and inclination of the vehicle. The at least one liquid control valve of a respective pair of single-sided swing arms of the wheel suspension is triggered depending on the orientation of the G-load on the vehicle detected by the acceleration sensor. Similar to the travel on a motorbike, the vehicle can be inclined in order to keep the spatial position of the resulting vector of the current G-load in agreement with the position and inclination of the vehicle. It can additionally be provided that the inclination is blocked during a standstill of the vehicle for example, straight travel of the vehicle or a travel through a curve of the vehicle at very low velocities (e.g. <3 km/h).

The vehicle further preferably comprises at least one position sensor for the respective detection of the position of the respective hydraulic cylinders, at least one vehicle position sensor for detecting the vehicle position at least in relation to the horizontal or vertical. Said position sensors are preferably coupled to the control device. If it is detected by means of the position sensors that the hydraulic cylinders of a respective pair of single-sided swing arms are extended identically, the inclination is automatically blocked, in combination with the simultaneous detection of a speed of the vehicle beneath a predetermined velocity value (e.g. 3 km/h). These functions are also possible without position sensors for detecting the vehicle position in the case of a suitable configuration of the vehicle.

The vehicle further preferably further comprises a pump and a liquid storage unit, wherein the pump is connected between the liquid storage unit and the liquid line, and can be triggered to transfer additional liquid from the liquid storage unit to the liquid line to, or to transfer liquid from liquid line the liquid storage unit. In this embodiment, the closed system which is formed by the active chambers of respectively associated hydraulic cylinders and the liquid line can be supplied with an increased pressure. As a result, the angles of inclination of the respective single-sided swing arms can be set autonomously in relation to the supporting vehicle element, with the result that the supporting vehicle element can be lifted or lowered further in relation to the wheels. This setting allows generally adjusting the ground clearance of the vehicle. Further-more, the vehicle can be righted merely by means of pressing a button. In this embodiment, in the case where the aforementioned described fluid line is laid between the passive chambers, said fluid line is provided with at least one opening and/or a compensating apparatus (not shown), through which pressure compensation with the external pressure is enabled.

The previously mentioned object is further achieved by a three-wheeled motor vehicle with a wheel suspension, which changes the mutual orientation of the front wheel axles and/or the rear wheel axles depending on the inclination of the vehicle. Such a three-wheeled motor vehicle can be inclined reliably in the direction towards the interior of the curve when travelling through curves, wherein reliable ground contact between the wheels and the road surface is ensured in any driving situation. Notice is expressly taken that the aforementioned embodiments can be combined at will. Only the combinations of embodiments are excluded which would lead to contradictions as a result of the combination.

The invention will be explained below in closer detail by reference to embodiments shown in the drawings, wherein.

Figure 1:
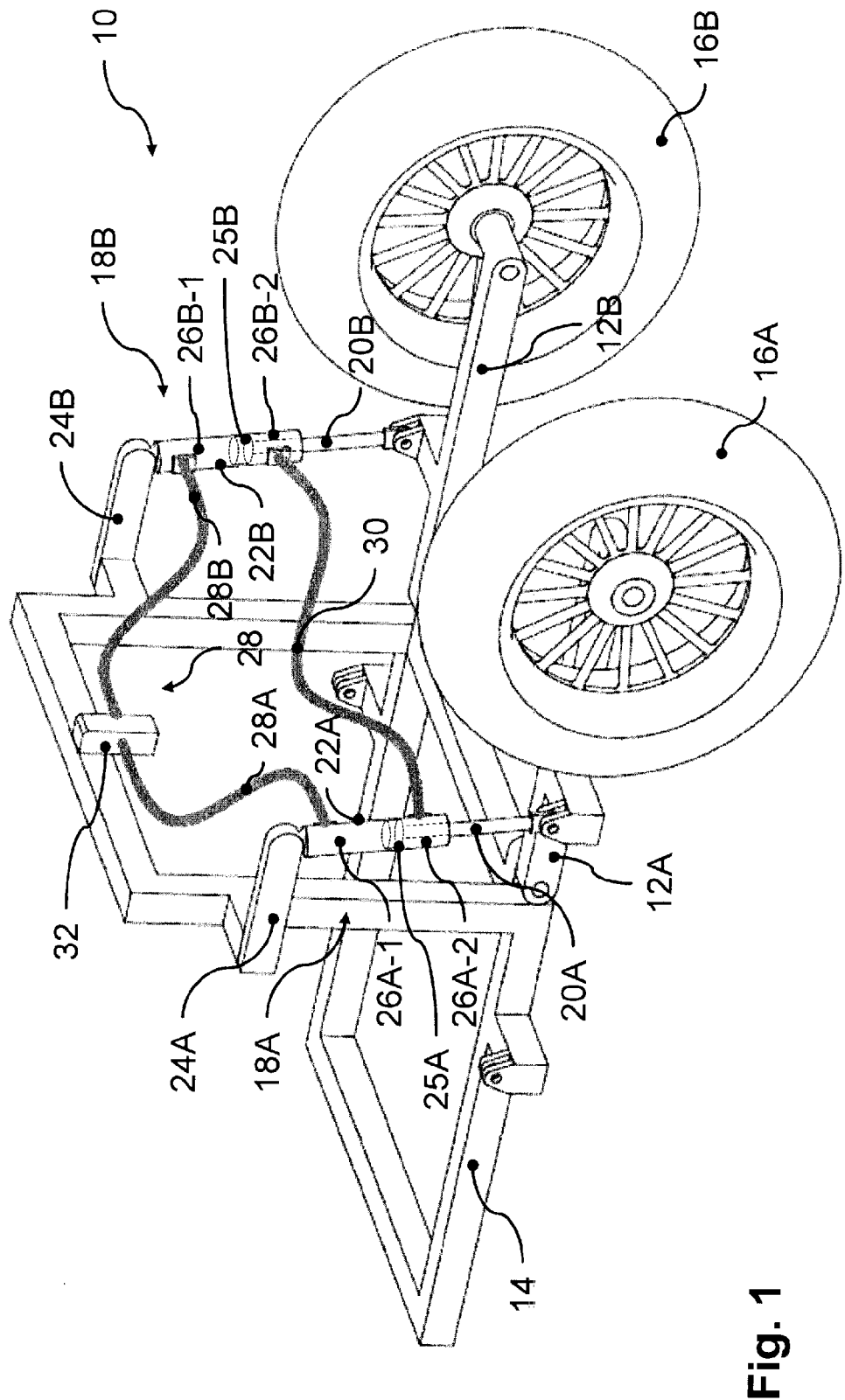
FIG. 1 shows a schematic view of a wheel suspension in a first exemplary configuration.

The same components or elements are assigned the same reference numerals over the entire drawing. FIG. 1 shows a schematic view of a wheel suspension 10 in a first exemplary configuration. The wheel suspension 10 comprises a pair of single-sided swing arms 12A, 12B, which are respectively linked with their first end separately to a supporting vehicle element 14 such as a frame element, a chassis etc, of a vehicle (not shown). Wheels 16A, 16B are rotatably fixed at the further end of the respective single-sided swing arms 12A, 12B. Furthermore, a hydraulic cylinder 18A, 18B is associated with each single-sided swing arm 12A, 12B. In this case, each hydraulic cylinder 18A, 18B is linked both to the respective single-sided swing arm 12A, 12B and to the supporting vehicle element 14. In the example shown in FIG. 1, a distal end of a piston rod 20A, 20B of the respective hydraulic cylinder 18A, 18B is linked to a section of a respective single-sided swing arm 12A, 12B. Furthermore, a respective hydraulic cylinder 18A, 18B is linked to a section of an extension arm 24A, 24B which is rigidly connected to the supporting vehicle element 14. It is understood that the hydraulic cylinders 18A, 18B can also be connected in a reverse orientation between the respective single-sided swing arm 12A, 12B and the supporting vehicle element 14. Alternatively, the extension arms 24A, 24B can be omitted and the respective hydraulic cylinders 18A, 18B can be linked directly to the supporting vehicle element 14 (not shown).

Each hydraulic cylinder 18A, 18B is subdivided in a fluid-tight manner into two chambers 26A-1, 26A-2 and 26B-1, 26B-2 by means of a movable piston 25A, 25B (schematically shown by the dashed lines), which piston is movably adjustable within the cylinder chamber 22A, 22B of a respective hydraulic cylinder 18A, 18B. A first chamber 26A-1, 26B-1 of the two chambers of the respective hydraulic cylinders 18A, 18B is characterized by an active function. A second chamber 26A-2, 26B-2 of the respective hydraulic cylinders 18A, 18B is characterized by a passive function. The respective active chambers 26A-1, 26B-1 are filled with liquid. Hydraulic oil can be listed in this case as an example for a suitable, incompressible liquid.

The respective active chambers 26A-1, 26B-1 of the hydraulic cylinders 18A, 18B of a pair of single-sided swing arms 12A, 12B are connected to each other via a liquid line 28, which in the variant shown in FIG. 1 is composed of two sections 28A, 28B (which will be discussed below in closer detail). As a result, the active chambers 26A-1, 26B-1 communicate with each other in a closed system via a liquid line 28. As a result of this configuration, movements of the piston 25A of the first hydraulic cylinder 18A are converted into respective counter-movements of the piston 25B of the second hydraulic cylinder 18B. Conversely, movements of the piston 25B of the second hydraulic cylinder 18B are converted into respective counter-movements of the piston 25A of the first hydraulic cylinder 18A.

The passive chambers 26A-2, 26B-2 of the two hydraulic cylinders 18A, 18B are filled with fluid. In this case, the fluid in the passive chambers 26A-2, 26B-2 exerts a force on the rear sides of the pistons 25A, 25B, which substantially corresponds to the force which is exerted by the pressure of the ambient air. As a result, the positions of the respective pistons 25A, 25B are advantageously influenced only irrelevantly by the passive chambers 26A-2, 26B-2. More precisely, neither excess pressure nor negative pressure in relation to the pressure of the ambient air is generated in the passive chambers 26A-2, 26B-2. This feature leads to the consequence that no disturbing forces are applied to the pistons 25A, 25B by the passive chambers 26A-2, 26B-2. In order to advantageously prevent the penetration of foreign particles such as dirt or dust or water for example into the passive chambers 26A-2, 26B-2, said chambers 26A-2, 26B-2 are connected via a fluid line 30, via which the passive chambers 26A-2, 26B-2 communicate with each other. The fluid line 30 can comprise at least one passage opening in order to produce a pressure exchange with the pressure of the exterior ambient environment.

In a further variant, the hydraulic cylinders 18A, 18B respectively comprise an air filter (not shown) associated with the passive chambers 26A-2, 26B-2, via which the passive chambers 26A-2, 26B-2 communicate individually with the ambient air. It is thus further ensured that as a result of the gas in the passive chambers (e.g. air) no force is exerted on the rear side of the pistons 25A, 25B, which force differs from the force exerted by the pressure of the ambient air. As a result, the positions of the pistons 25A, 25B are not influenced by the passive chambers 26A-2, 26B-2. At the same time, no foreign particles or liquids enter the passive chambers 26A-2, 26B-2.

The wheel suspension 10 shown in FIG. 1 further comprises a liquid control valve 32 which is interposed in the liquid line 28. The liquid line 28 is thus subdivided into two sections 28A, 28B, namely a first section 28A which extends between the active chamber 26A-1 of the first hydraulic cylinder 18A and the liquid control valve 32, and a second section 28B which extends between the active chambers 26B-1 of the second hydraulic cylinder 18B and the liquid control valve 32. The liquid control valve 32 can be triggered to control liquid exchange between the two active chambers 26A-1, 26B-1. In the case of such triggering of the liquid control valve 32 for blocking the liquid exchange within the liquid line 28, the counter-movements of the pistons 25A, 25B within the hydraulic cylinders 18A, 18B are prevented. The counter-movements of the two pistons 25A, 25B become increasingly more smoothly with increasing expansion of the degree of opening of the liquid control valve 32. This releases respective inclinations of the single-sided swing arms 12A, 12B in relation to the supporting vehicle element 14. In other words, a vehicle (not shown) provided with the wheel suspension 10 can be inclined simply in the direction of the interior of the curve during travel through curves. In order to prevent any inclination in a vehicle in the righted state, the liquid control valve 32 is closed so that liquid exchange within the liquid line 28 is blocked. It is understood that the position of the hydraulic cylinders can be changed and be twisted by 180° for example.

Figure 2:
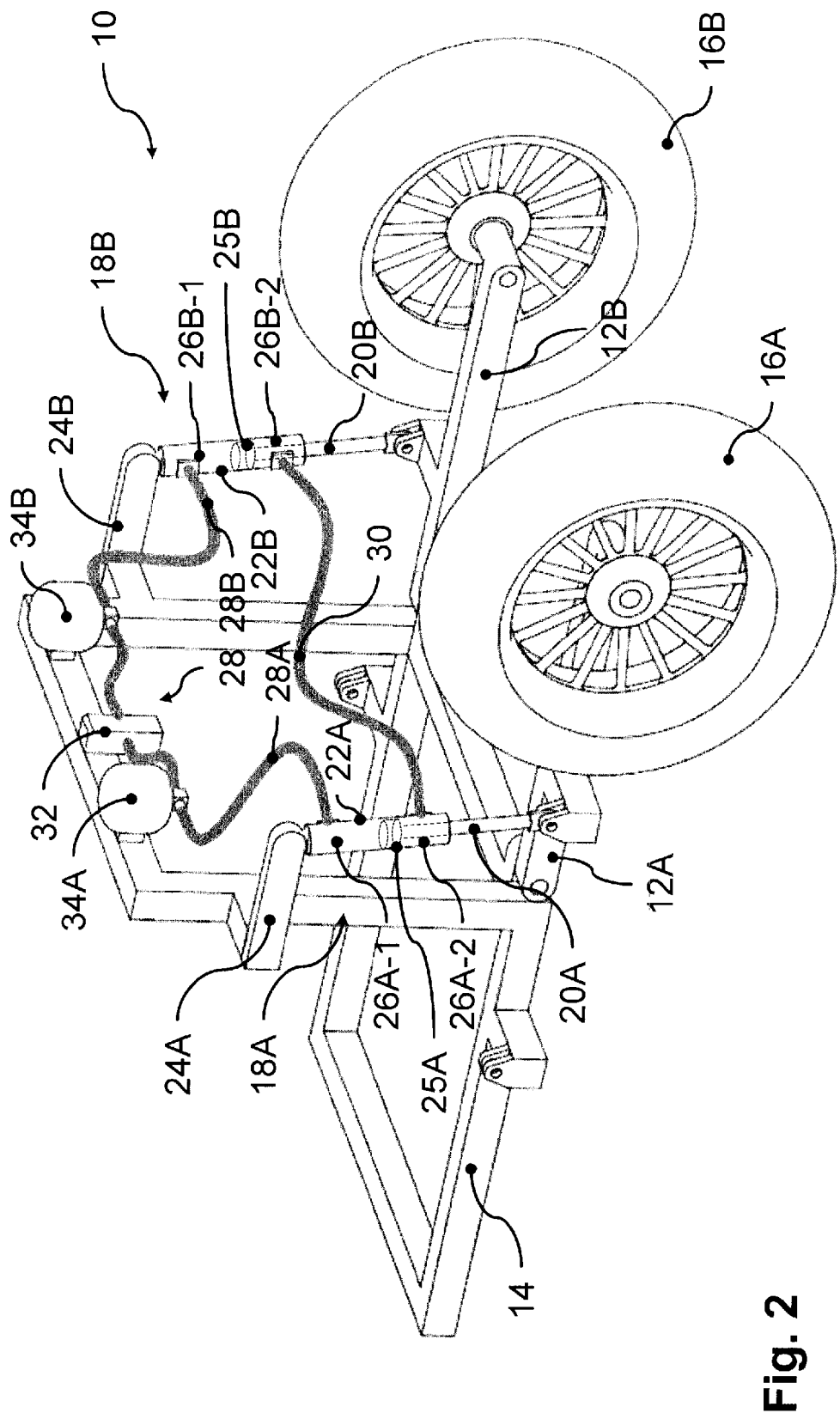
FIG. 2 shows a schematic view of a wheel suspension in a second exemplary configuration.

FIG. 2 shows a schematic view of a wheel suspension 10 in a second configuration. Said wheel suspension 10 differs from the wheel suspension shown in FIG. 1 in that two dampening units 34A, 34B are additionally comprised. In this case, the respective inputs of the dampening units 34A, 34B are respectively connected to the sections 28A, 28B of the liquid line 28, which was subdivided by the aforementioned liquid control valve 32 into the sections 28A, 28B. In other words, a first dampening unit 34A is connected to the section 28A of the liquid line 28 which extends between the active chamber 26A-1 of the first hydraulic cylinder 18A and the liquid control valve 32. Furthermore, a second dampening unit 34B is connected to the section 28B of the liquid line 28 which extends between the active chamber 26B-1 of the second hydraulic cylinder 18B and the liquid control valve 32. Finer strokes of the pistons 25A, 25B within the hydraulic cylinders 18A, 18B are achieved by providing the interposed dampening units 34A, 34B. At the same time, the dampening units 34A, 34B assume a function for dampening a movement of the single-sided swing arms 12A, 12B in relation to the supporting vehicle element 14. As a result, shocks applied to the wheels 16A, 16B are absorbed and dampened more reliably. Therefore, driving comfort is increased. The extension arms 24A, 24B could also be omitted in this second embodiment. It is understood that the position of the hydraulic cylinders can be changed and twisted by 180° for example.

Figure 3A:
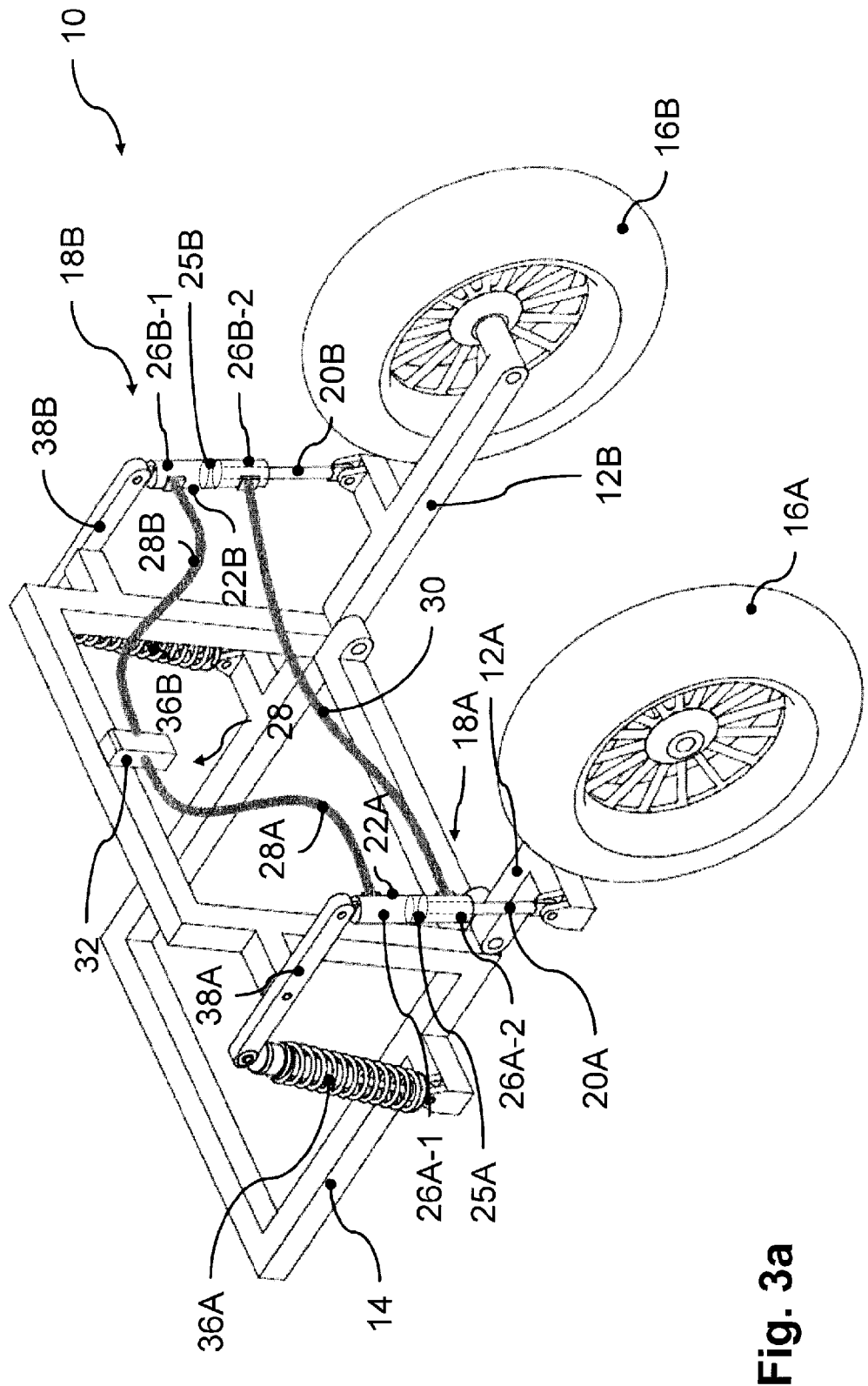
FIGS. 3a, 3b and 3c show schematic illustrations in different views of a wheel suspension in a third exemplary configuration, with FIG. 3b illustrating a three-wheeled motor vehicle.
Figure 3B:
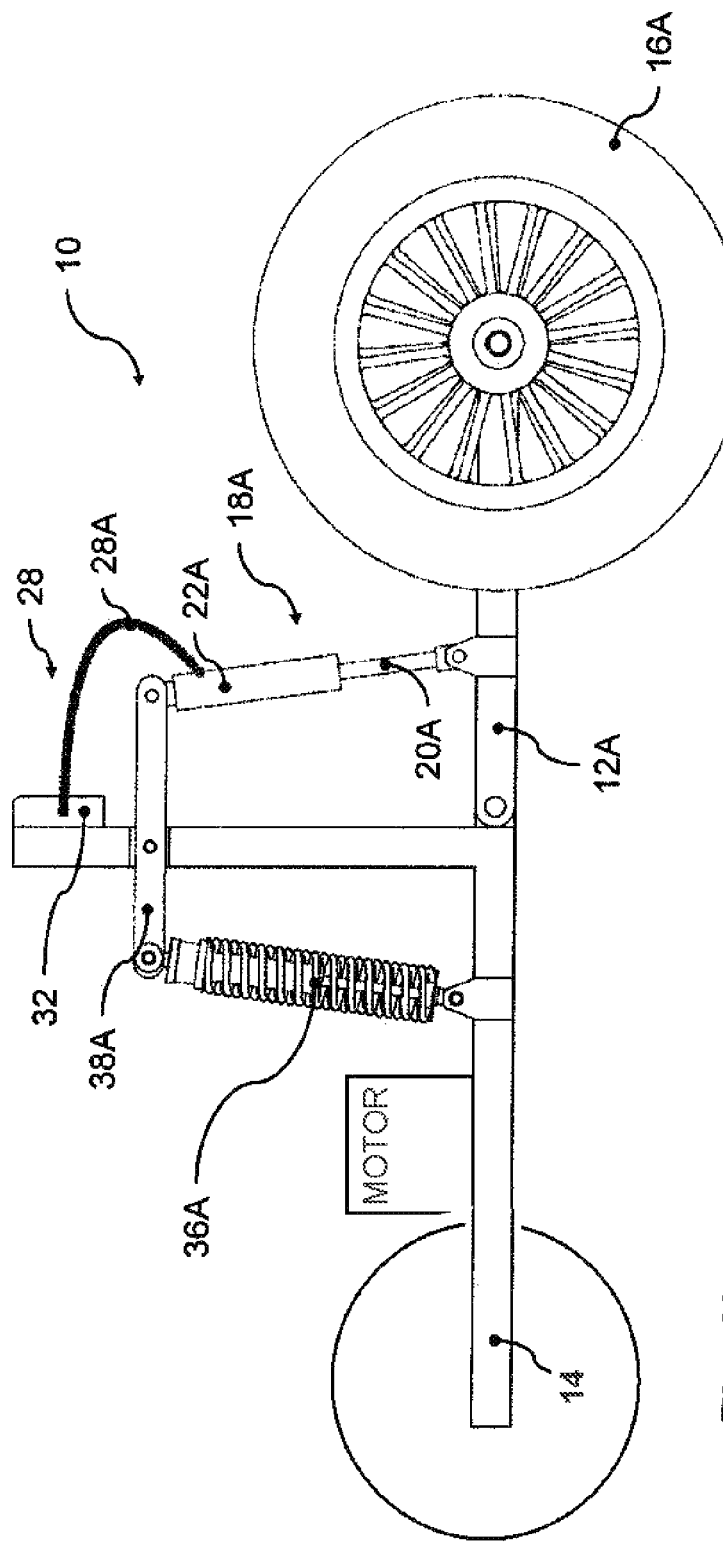
Figure 3C:
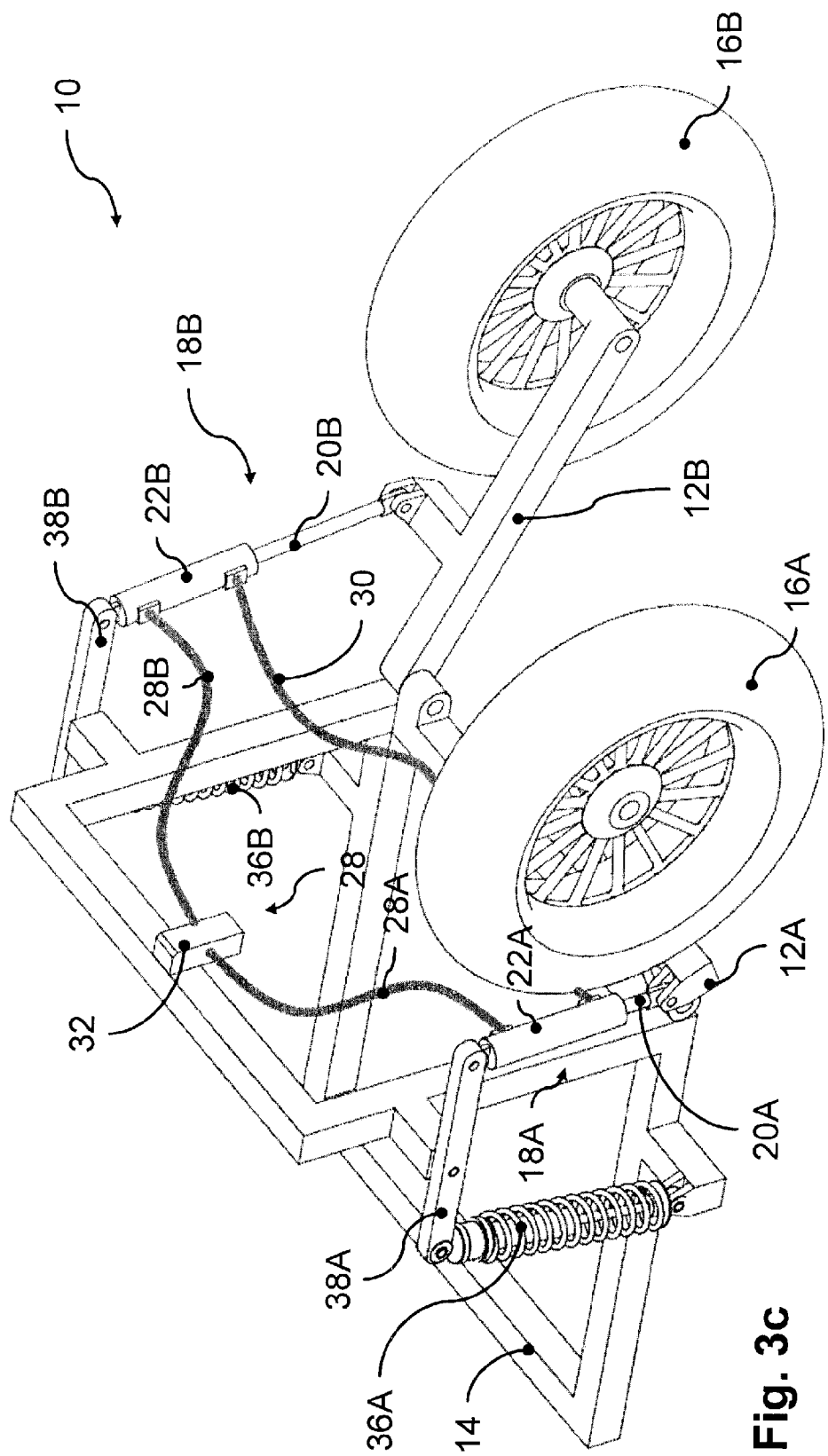

FIGS. 3a to 3c show different views of the wheel suspension 10 in a third variant. FIG. 3a shows the wheel suspension 10 in a perspective view in a neutral position, with blocked inclination. FIG. 3b shows a side view of the wheel suspension 10 shown in FIG. 3a. FIG. 3c shows a perspective view of the wheel suspension 10 shown in FIGS. 3a, 3b with released inclination of the vehicle. In addition to the wheel suspension shown in FIG. 1, the wheel suspension 10 shown in FIGS. 3a to 3c shows a pair of shock absorbers 36A, 36B for absorbing and dampening shocks which are applied to the wheels 16A, 16B. A shock absorber 36A, 36B is respectively associated with a single-sided swing arm 12A, 12B. Furthermore, the shock absorbers 36A, 36B are respectively connected to the supporting vehicle element 14 and the respective single-sided swing arms 12A, 12B.

The wheel suspension 10 shown in FIGS. 3a to 3c further comprises a pair of lever elements 38A, 38B, which are respectively associated with a single-sided swing arm 12A, 12B and are pivotably attached to the supporting vehicle element 14. Respective ends of the first and second hydraulic cylinder 18A, 18B and the first and second shock absorber 36A, 36B are linked to sections of the two lever elements 38A, 38B which are opposite to each other. Furthermore, the further ends of the two hydraulic cylinders 18A, 18B are linked to a respectively associated single-sided swing arm 12A, 12B. Furthermore, the respective further ends of the two shock absorbers 36A, 36B are respectively linked to the supporting vehicle element 14. The two hydraulic cylinders 18A, 18B are thus connected via the respectively associated lever elements 38A, 38B to the respective shock absorbers 36A, 36B. This configuration ensures a separate absorption and dampening of shocks on the wheels 16A, 16B, irrespective of whether the vehicle is in the upright position, or the inclination is blocked (see FIGS. 3a, 3b), or is situated in the inclined position (see FIG. 3c), or the inclination is released. Irrespective of the respective inclination characteristics of the vehicle and irrespective of whether inclination is blocked or not, reliable ground contact between the wheels 16A, 16B and the road surface is ensured at all times. It is understood that the hydraulic cylinders 18A, 18B and shock absorbers 36A, 36B can be exchanged in their arrangement and/or be twisted about 180° for example.

Figure 4:
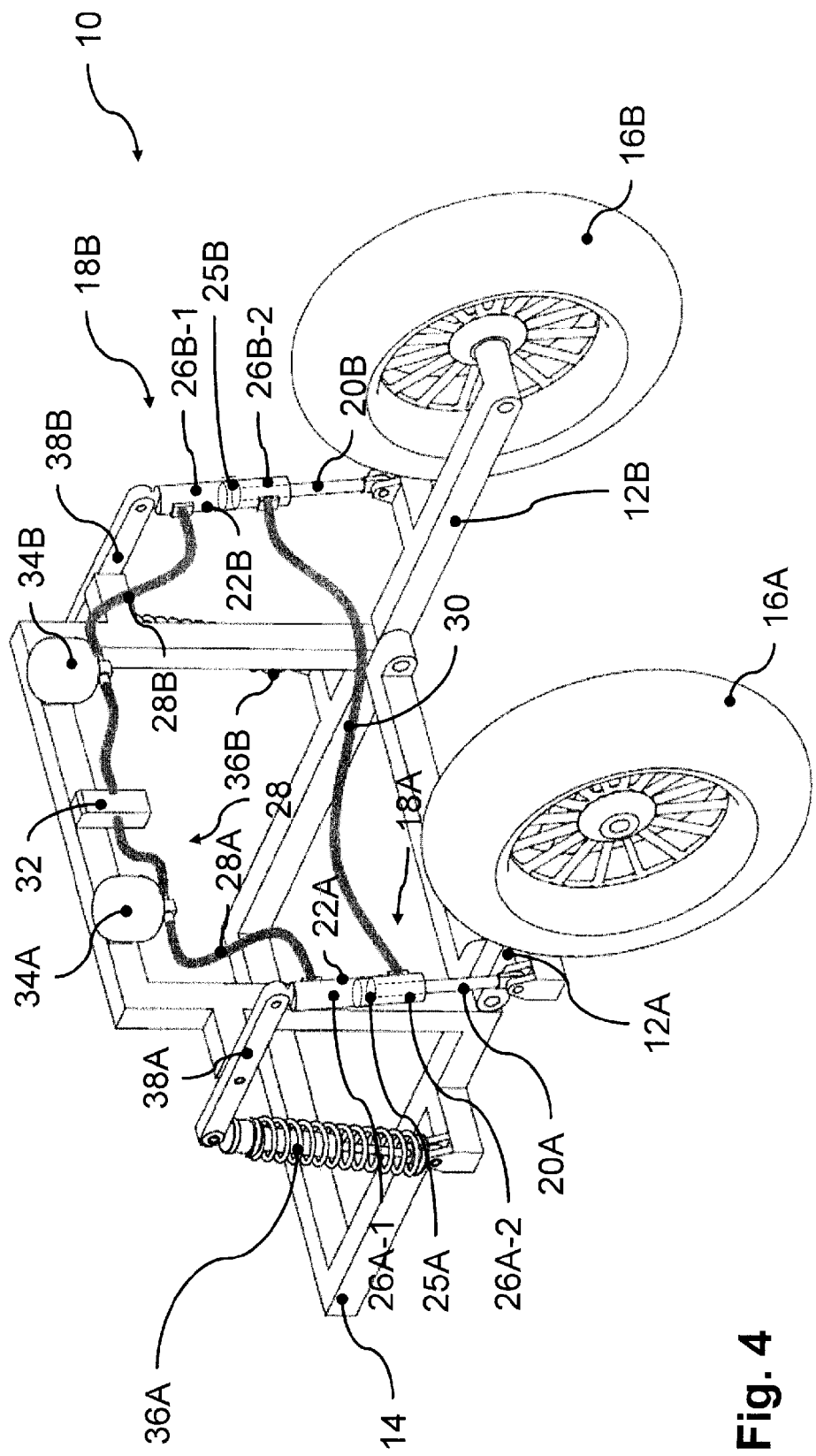
FIG. 4 shows a schematic view of a wheel suspension in a fourth exemplary configuration.

FIG. 4 shows a schematic view of the wheel suspension 10 in a further variant. This wheel suspension 10 differs from the wheel suspension shown in FIGS. 3a to 3c in the respect that the dampening units 34A, 34B shown in FIG. 2 are respectively additionally connected to the liquid line 28. In this case, the dampening units 34A, 34B are connected to the sections 28A, 28B of the liquid line 28 which are subdivided by the liquid control valve 32. In addition to the shock absorbers 36A, 36B, the dampening units 34A, 34B provide dampening in order to reliably absorb and dampen shocks which are applied to the wheels 16A, 16B. The liquid control valve 32 can be triggered either by a motor or manually.

Furthermore, the liquid control valve 32 is formed to progressively reduce a liquid exchange between the active chambers 26A-1, 26B-1 of the two hydraulic cylinders 18A, 18B with increasing extension of the piston 25A, 25B into the cylinder chamber 22A, 22B or out of said chamber. The inclination characteristics of the vehicle can thus be adjusted individually. The liquid control valve 32 is closed slowly when the inclination of one of the two single-sided swing arms 12A, 12B in relation to the supporting vehicle element 14 approaches a predetermined maximum inclination or inclination limit in order to thus progressively slow down or reduce any further reaching inclination. The inclination of the vehicle is thus reduced progressively with increasing approach to the maximum inclination.

The liquid control valve 32 can be opened completely again in the opposite direction, i.e. the direction for righting the vehicle, in order to provide the lowest possible resistance against the righting of the vehicle. The movement for righting the vehicle is thus released immediately.

Although not shown in the drawings, the liquid control valve 32 can be omitted. In order to thus still achieve the desired inclination characteristics, mechanical brakes (not shown) can be provided which are respectively arranged between the supporting vehicle element 14 and the single-sided swing arms 12A, 12B in such a way that a pivoting movement of the single-sided swing arms 12A, 12B in relation to the supporting vehicle element 14 is braked, blocked (neutral position) or released. This ensures individual triggering of the respective stroke of the hydraulic cylinders 18A, 18B. The mechanical brakes can be respectively associated with a hydraulic cylinder 18A, 18B, and can be further triggered to brake, block or release a movement of the respective piston rods 20A, 20B in relation to the cylinder 22A, 22B. It is understood that the hydraulic cylinders 18A, 18B and shock absorbers 36A, 36B can be exchanged in their arrangement and/or be twisted about 180° for example.

Figure 5:
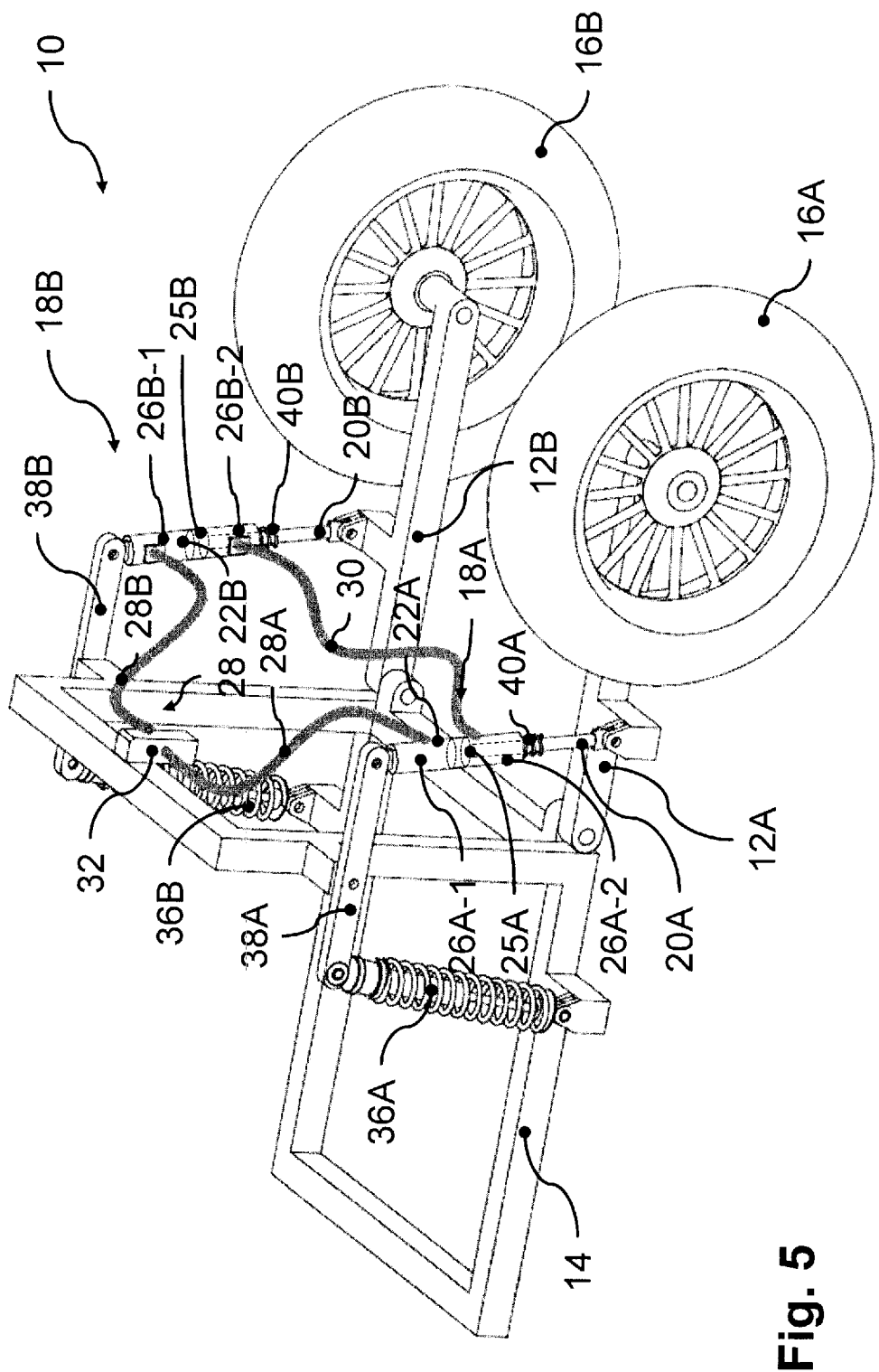
FIG. 5 shows a schematic view of a wheel suspension in a fifth exemplary configuration.

FIG. 5 shows a schematic view of the wheel suspension 10 in a fifth variant. Said wheel suspension 10 differs from the configuration of the wheel suspension shown in FIGS. 3*a* to 3*c* in the respect that a pair of spring elements 40A, 40B is additionally provided in order to individually apply a restoring force between the supporting vehicle element 14 and the respective single-sided swing arms 12A, 12B. As is shown in FIG. 5, the spring elements 40A, 40B can be inserted for this purpose at least in part on the sections of the piston rods 20A, 20B extending outside of the cylinders 22A, 22B. Once the inclination of one of the single-sided swing arms 12A, 12B reaches a predetermined angle of inclination in relation to the supporting vehicle element 14, an otherwise freely exposed end section of one of the spring elements 40A, 40B strikes said single-sided swing arm (directly or indirectly). A reverse restoring force is thus applied between said single-sided swing arm and the supporting vehicle element 14. The righting of the vehicle can thus generally be supported.

Although not shown in the drawing, more than one respective spring element 40A, 40B can also be provided per hydraulic cylinder 18A, 18B. For example, two or more spring elements can be provided per hydraulic cylinder 18A, 18B in all embodiments, which spring elements have a different spring constant. As a result, the respective springs with a lower spring constant can apply a slight reverse restoring force between the single-sided swing arm and the supporting vehicle element 14, and springs with a higher spring constant, at progressive inclination of the vehicle, can apply a higher reverse restoring force in between. As a result, a reverse restoring force is applied which has a progressive property.

Although not shown in FIG. 5, the spring elements 40A, 40B can be arranged at least in sections within the active chambers 26A-1, 26B-1 or the passive chambers 26A-2, 26B-2. It can further be provided that the spring elements 40A, 40B are connected parallel to a respective hydraulic cylinder 18A, 18B between the supporting vehicle element 14 and the respective single-sided swing arm 12A, 12B. The spring elements 40A, 40B shown in FIG. 5 are formed as a mechanical spring. The spring elements can be arranged alternatively as a gas spring, or as a combination of mechanical springs and gas springs.

Although not shown in the drawing, the hydraulic cylinders 18A, 18B can respectively be linked between a section of a respectively associated single-sided swing arm 12A, 12B and the supporting vehicle element 14. The single-sided swing arms 12A, 12B can be pivotably connected to the supporting vehicle element 14. Furthermore, the shock absorbers 36A, 36B can further be respectively linked between a further section of a respective single-sided swing arm 12A, 12B and the supporting vehicle element 14. In other words, the shock absorbers 36A, 36B are connected between a section of the single-sided swing arm 12A, 12B, which is extended via the pivot point of the single-sided swing arm 12A, 12B on the supporting vehicle element 14, and the supporting vehicle element 14. In this example, the hydraulic cylinders 18A, 18B are subject to tension. The arrangement between the hydraulic cylinders 18A, 18B and the shock absorbers 36A, 36B can also be exchanged, so that the hydraulic cylinders 18A, 18B are respectively arranged between the extended section of the single-sided swing arms 12A, 12B and the supporting vehicle element 14, and the shock absorbers 36A, 36B are respectively arranged between the supporting vehicle element 14 and the portion of the respective single-sided swing arms 12A, 12B which carries the wheels 16A, 16B. For example, the arrangement of the hydraulic cylinders 18A, 18B and shock absorbers 36A, 36B on both single-sided swing arms 12A, 12B of a pair of single-sided swing arms is the same. In this arrangement (which is also not shown), the hydraulic cylinders 18A, 18B are subject to pressure. In this example, the respective ends of the hydraulic cylinders 18A, 18B and the shock absorbers 36A, 36B are directly connected to the single-sided swing arms 12A, 12B without the lever element 38A, 38B shown in FIGS. 3*a* to 3*c*, 4, 5 and 6. The mechanical loading capability is thus increased. Costs and weight are further saved. This embodiment is less preferred because the directions of the movement of the hydraulic cylinders and the shock absorbers (operating direction) do not extend in parallel, along a line and in the same direction with respect to each other. Furthermore, the hydraulic cylinders do not act independently of the shock absorbers in this less preferred example. It is understood that the hydraulic cylinders 18A, 18B and the shock absorbers 36A, 36B can be exchanged in their arrangement and/or be twisted about 180° for example.

Figure 6:
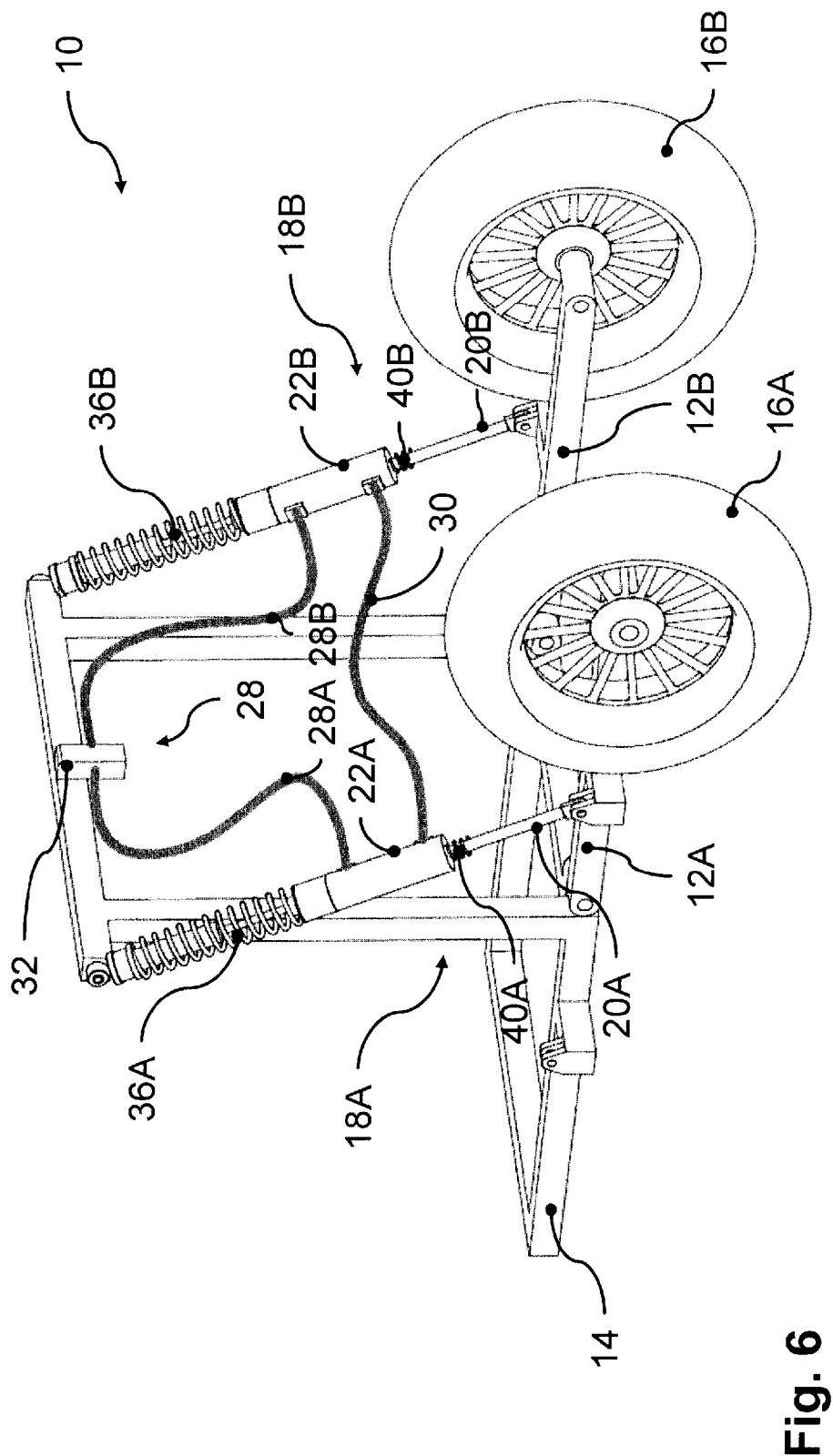
FIG. 6 shows a schematic view of a wheel suspension in a sixth exemplary configuration.

FIG. 6 shows a wheel suspension 10 in which the hydraulic cylinders 18A, 18B and the shock absorbers 36A, 36B are respectively serially arranged in pairs with respect to each other. In the illustrated embodiment, the hydraulic cylinders 18A, 18B are respectively linked to the single-sided swing arms 12A, 12B and the shock absorbers 36A, 36B are respectively linked to the supporting vehicle element 14. Furthermore, the hydraulic cylinders 18A, 18B are directly (rigidly) connected at their further ends to the shock absorbers 36A, 36B. Although not shown in the drawing, the hydraulic cylinders 18A, 18B and shock absorbers 36A, 36B can be exchanged in their arrangement. As a result of this arrangement, the single-sided swing arms 12A, 12B are deflected according to the inclination of the vehicle according to the aforementioned embodiments by means of the hydraulic cylinders 18A, 18B. Furthermore, shocks on the wheels 16A, 16B are reliably absorbed by the shock absorbers 36A, 36B that are serially connected.

The absorption of the shocks occurs in this case entirely independent of the actual position of the hydraulic cylinders 18A, 18B or the inclination of the vehicle. The ends of the hydraulic cylinders 18A, 18B facing the respective single-sided swing arms 12A, 12B are respectively provided with the spring elements 40A, 40B. As a result of the serial arrangement between the hydraulic cylinders 18A, 18B and the shock absorbers 36A, 36B, interposed components such as the aforementioned lever element (see FIGS. 3*a* to 3*c*, 4 and 5) can be saved. This reduces costs and weight. It is a further advantage that the hydraulic cylinders 18A, 18B and the shock absorbers 36A, 36B respectively move in pairs along a line or operate along a common axis. Improved interaction is thus achieved in general. It is understood that the hydraulic cylinders 18A, 18B and the shock absorbers 36A, 36B can be exchanged in their arrangement and/or be twisted about 180° for example.

Figure 7:
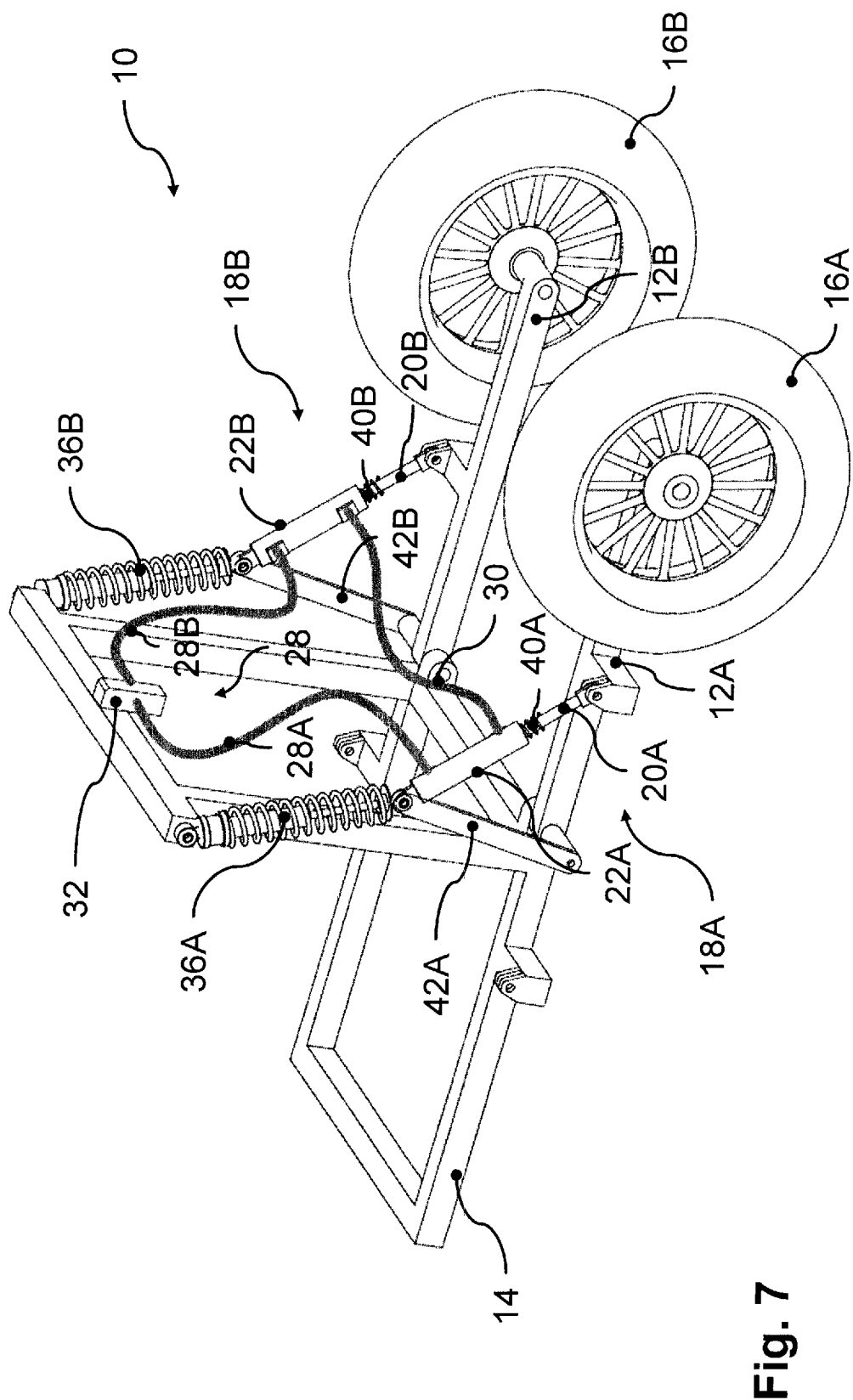
FIG. 7 shows a schematic view of a wheel suspension in a seventh exemplary configuration.

FIG. 7 shows a wheel suspension 10 in a further embodiment. This embodiment differs from the embodiment shown in FIG. 6 in that the hydraulic cylinders 18A, 18B and shock absorbers 36A, 36B respectively arranged in pairs are not rigidly connected to each other but in an articulated manner, or are pivotably linked to each other. Struts 42A, 42B are respectively linked to the pivot point. The further ends of the respective struts 42A, 42B are linked to the supporting vehicle element 14. The axes for linking the struts 42A, 42B and the axes for linking the single-sided swing arms 12A, 12B to the supporting vehicle element 14 extend along a line. The hydraulic cylinders 18A, 18B can thus operate in a defined manner and shocks on the wheels 16A, 16B are reliably absorbed. Although not shown in the drawing, the hydraulic cylinders 18A, 18B and the shock absorbers 36A, 36B can be exchanged in their arrangement. The hydraulic cylinders 18A, 18B are equipped with spring elements 40A, 40B at ends which face the respective single-sided swing arms 12A, 12B. The wheel suspension 10 shown in FIG. 7 is especially stable and works reliably. Even strong shocks on the wheels 16A, 16B are reliably absorbed. It is understood that the hydraulic cylinders 18A, 18B and the shock absorbers 36A, 36B can be exchanged in their arrangement and/or be twisted about 180° for example.

Figure 8:
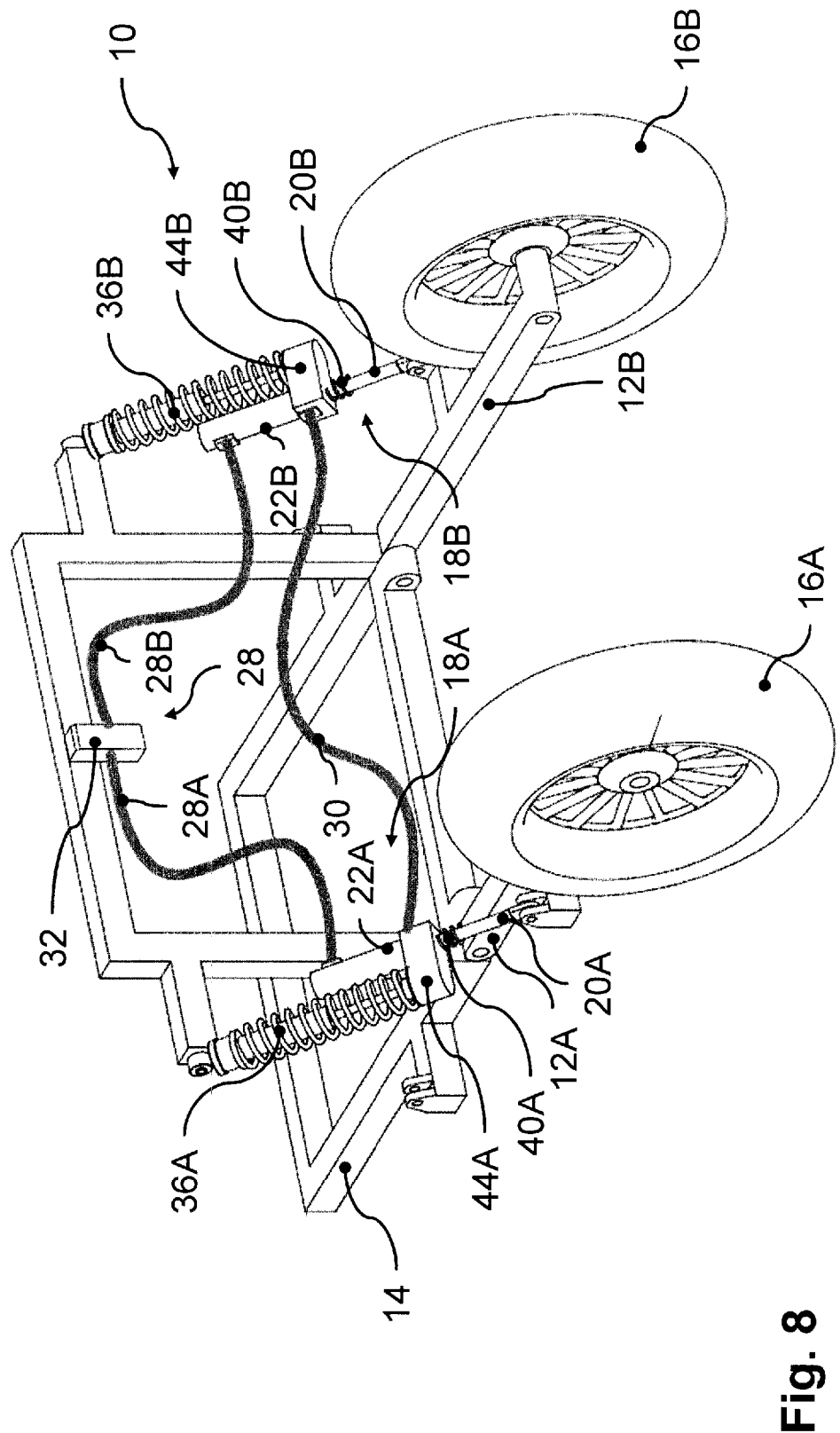
FIG. 8 shows a schematic view of a wheel suspension in an eighth exemplary configuration.

FIG. 8 shows a further advantageous embodiment of the invention. The wheel suspension 10 which is shown here also comprises hydraulic cylinders 18A, 18B and shock absorbers 36A, 36B arranged in pairs with respect to each other. The hydraulic cylinders 18A, 18B and shock absorbers 36A, 36B are arranged in serial functionality, wherein they are offset in off-centre manner with respect to each other and overlap each other in sections. The hydraulic cylinders 18A, 18B and shock absorbers 36A, 36B are rigidly connected to each other in this arrangement. The shock absorbers 36A, 36B are linked to the supporting vehicle element 14 and are respectively connected to or accommodated in a component 44A, 44B at their further ends. Furthermore, the cylinder chambers 22A, 22B of the respective hydraulic cylinders 18A, 18B are rigidly connected to the component 44A, 44B. The piston rods 20A, 20B of the respective hydraulic cylinders 18A, 18B extend through apertures respectively provided in the component 44A, 44B. The ends of the piston rods 20A, 20B are linked to the single-sided swing arms 12A, 12B. In addition to the component 44A, 44B as mentioned here, further direct or indirect types of connection can be provided. It is understood that the hydraulic cylinders 18A, 18B and shock absorbers 36A, 36B can be exchanged in their arrangement.

In this embodiment, the hydraulic cylinders 18A, 18B and shock absorbers 36A, 36B are arranged in series with respect to each other. In contrast to the embodiment shown in FIG. 6, which also has a serial arrangement, the axes of the hydraulic cylinders 18A, 18B and shock absorbers 36A, 36B of the wheel suspension 10 shown in FIG. 8 do not extend along a line but in parallel with respect to each other. The operation is thus unimpaired so that the hydraulic cylinders 18A, 18B can continue to operate in a defined manner and the shock absorbers 36A, 36B reliably absorb shocks. In comparison with the embodiment shown in FIG. 6, a more compact configuration of the wheel suspension 10 is achieved.

In the embodiment shown in FIG. 8, the respective cylinder chambers 22A, 22B and the associated shock absorbers 36A, 36B extend in sections in overlapping arrangement. The extension of the arrangement of the hydraulic cylinders 18A, 18B and shock absorbers 36A, 36B as compared with the arrangement of hydraulic cylinders 18A, 18B and shock absorbers 36A, 36B as shown in FIG. 6 is reduced by the length of the cylinder chamber 22A, 22B in the longitudinal extension. The wheel suspension 10 shown in FIG. 8 is thus more compact. Alternatively or in addition, an entirely greater deflection of the single-sided swing arms 12A, 12B can be achieved in comparison with the wheel suspension 10 shown in FIG. 6 because hydraulic cylinders 18A, 18B with an entirely greater extension can be used. Alternatively or in addition, the spring excursion/dampening path of the shock absorbers 36A, 36B can be increased so that a more comfortable dampening of the vehicle is achieved. It is understood that the hydraulic cylinders 18A, 18B and the shock absorbers 36A, 36B can be exchanged in their arrangement and/or be twisted about 180° for example.

As already mentioned, the vehicle can comprise at least one acceleration sensor which is formed for detecting the orientation of a G-load on the vehicle, and a control device which is coupled to the at least one acceleration sensor and the liquid control valve. The at least one liquid control valve of a respective pair of single-sided swing arms of the wheel suspension is preferably precisely triggered depending on the orientation of the G-load on the vehicle which is detected by the acceleration sensor. Similar to travel on a motorbike, the vehicle is inclined in such a way that said horizontal component is compensated. As described above, the release or blocking of the inclination of the vehicle can be triggered by respective triggering of the liquid control valve arranged between the liquid line of a respective wheel suspension. Alternatively, the release of blocking of the inclination of the vehicle can be controlled by the aforementioned mechanical brakes.

| List of reference numerals | |
|---|---|
| 10 | Wheel suspension |
| 12A | Single-sided swing arm |
| 12B | Single-sided swing arm |
| 14 | Supporting vehicle element |
| 16A | Wheel |
| 16B | Wheel |
| 18A | Hydraulic cylinder |
| 18B | Hydraulic cylinder |
| 20A | Piston rod |
| 20B | Piston rod |
| 22A | Cylinder chamber |
| 22B | Cylinder chamber |
| 24A | Extension arm |
| 24B | Extension arm |
| 25A | Piston |
| 25B | Piston |
| 26A-1 | Active chamber |
| 26B-1 | Active chamber |
| 26A-2 | Passive chamber |
| 26B-2 | Passive chamber |
| 28 | Liquid line |
| 28A | Section of 28 |
| 28B | Section of 28 |
| 30 | Fluid line |
| 32 | Liquid control valve |
| 34A | Dampening unit |
| 34B | Dampening unit |
| 36A | Shock absorber |
| 36B | Shock absorber |
| 38A | Lever element |
| 38B | Lever element |
| 40A | Lever element |
| 40B | Lever element |
| 42A | Strut |
| 42B | Strut |
| 44A | Component |
| 44B | Component |

The invention claimed is:

1. A wheel suspension (10) for a vehicle with a supporting vehicle element (14), wherein the wheel suspension (10) comprises at least one pair of single-sided swing arms (12A, 12B), wherein each of the single-sided swing arms (12A, 12B) is linked separately to the supporting vehicle element (14), and a wheel (16A, 16B) is rotatably fastened to the single-sided swing arm (12A, 12B), wherein each of the single-sided swing arms (12A, 12B) is associated with a hydraulic cylinder (18A, 18B) which is linked to the single-sided swing arm (12A, 12B) and/or the supporting vehicle element (14), wherein each hydraulic cylinder (18A, 18B) is subdivided by a movable piston (25A, 25B) in a fluid-tight manner into two chambers, characterized in that each hydraulic cylinder (18A, 18B) comprises a first chamber (26A-1, 26B-1) with an active function and a second chamber (26A-2, 26B-2) with a passive function, wherein the active chamber (26A-1, 26B-1) is filled with liquid, wherein the active chambers (26A-1, 26B-1) of a pair of single-sided swing arms (12A, 12B) communicate with each other via a liquid line (28) in a closed system, by means of which movements of the piston (25A) of a first one of the hydraulic cylinders (18A) produce respective counter-movements of the piston (25B) of a second one of the hydraulic cylinders (18B), and wherein the passive chamber (26A-2, 26B-2) is filled with fluid, wherein the fluid in the passive chamber (26A-2, 26B-2) exerts a force on the rear side of the piston (25A, 25B), which substantially corresponds to the force exerted by the pressure of the ambient air and thus influences the positions of the piston (25A, 25B) insignificantly, and further characterized by comprising a fluid line (30) associated with the passive chambers (26A-2,26B-2), via which the passive chambers (26A-2,26B-2) of the hydraulic cylinders (18A,18B) of a pair of single-sided swing arms (12A,12B) are formed to communicate with each other.

2. A wheel suspension (10) according to claim 1, characterized in that it comprises at least one liquid control valve (32) which is arranged in the liquid line (28) between the active chambers of the hydraulic cylinders and can be triggered to control the liquid exchange between the active chambers (26A-1,26B-1) of the hydraulic cylinders (18A, 18B) of a pair of single-sided swing arms (12A, 12B).

3. A wheel suspension (10) according to claim 2, characterized in that the at least one liquid control valve (32) is formed to control a liquid exchange between the active chambers (26A-1,26B-1) of the hydraulic cylinders (18A, 18B) of a pair of single-sided swing arms (12A,12B) with increasing extension of the piston (25A,25B) into the cylinder chamber (22A,22B) or out of said chamber according to a selectable functional curve.

4. A wheel suspension (10) according to claim 2, characterized in that it comprises at least two dampening units (34A,34B) whose inputs are respectively connected to the liquid line (28) in a section (28A,28B) thereof between the active chambers (26A-1,26B-1) of the hydraulic cylinders (18A,18B) and the liquid control valve (32), respectively.

5. A wheel suspension (10) according to claim 1, characterized in that it comprises a number of spring elements (40A,40B), wherein at least one respective spring element (40A,40B) is arranged and formed between the supporting vehicle element (14) and the single-sided swing arms (12A, 12B) in such a way that a restoring force is applied between the supporting vehicle element (14) and the respective single-sided swing arms (12A,12B).

6. A wheel suspension (10) according to claim 1, characterized in that it comprises a number of shock absorbers (36A,36B), wherein at least one respective shock absorber (36A,36B) is associated with a single-sided swing arm (12A,12B), wherein the shock absorbers (36A,36B) are respectively connected to the supporting vehicle element (14) and/or the single-sided swing arms (12A,12B).

7. A wheel suspension (10) according to claim 6, characterized in that it comprises a number of lever elements (38A,38B), wherein a lever element (38A, 38B) respectively associated with a single-sided swing arm (12A,12B) is pivotably attached to the supporting vehicle element (14), and whose sections are respectively connected to the shock absorber (36A,36B) and/or the hydraulic cylinder (18A, 18B).

8. A wheel suspension (10) according to claim 6, characterized in that the shock absorbers (36A,36B) and the hydraulic cylinders (18A,18B) of a respectively associated single-sided swing arm (12A,12B) are serially connected to each other.

9. A wheel suspension (10) according to claim 8, characterized in that the shock absorbers (36A,36B) and the hydraulic cylinders (18A,18B) of a respectively associated single-sided swing arm (12A,12B) are rigidly connected to each other.

10. A wheel suspension (10) according to claim 6, characterized in that the shock absorbers (36A,36B) and the hydraulic cylinders (18A,18B) of a respectively associated single-sided swing arm (12A,12B) are arranged in the longitudinal direction in an overlapping manner at least in a portion and are rigidly connected to each other.

11. A wheel suspension (10) according to claim 1, characterized in that the single-sided swing arms (12A,12B) respectively associated with a hydraulic cylinder (18A,18B) can be deflected in opposite directions in response to a pressure load or a tensile load of the active chamber (26A-1,26B-1) of the respective hydraulic cylinder (18A,18B).

12. A vehicle with a wheel suspension (10) according to claim 1, formed for inclination in the direction towards the interior of the curve when travelling through a curve.

13. A three-wheeled motor vehicle with a wheel suspension according to claim 1, which changes the mutual orientation of the front wheel axles and/or rear wheel axles depending on an inclination of the vehicle.

14. A wheel suspension (10) for a vehicle with a supporting vehicle element (14), wherein the wheel suspension (10) comprises at least one pair of single-sided swing arms (12A, 12B), wherein each of the single-sided swing arms (12A, 12B) is linked separately to the supporting vehicle element (14), and a wheel (16A, 16B) is rotatably fastened to the single-sided swing arm (12A, 12B), wherein each of the single-sided swing arms (12A, 12B) is associated with a hydraulic cylinder (18A, 18B) which is linked to the single-sided swing arm (12A, 12B) and/or the supporting vehicle element (14), wherein each hydraulic cylinder (18A,18B) is subdivided by a movable piston (25A, 25B) in a fluid-tight manner into two chambers, characterized in that each hydraulic cylinder (18A, 18B) comprises a first chamber (26A-1, 26B-1) with an active function and a second chamber (26A-2, 26B-2) with a passive function, wherein the active chamber (26A-1, 26B-1) is filled with liquid, wherein the active chambers (26A-1, 26B-1) of a pair of single-sided swing arms (12A, 12B) communicate with each other via a liquid line (28) in a closed system, by means of which movements of the piston (25A) of a first one of the hydraulic cylinders (18A) produce respective counter-movements of the piston (25B) of a second one of the hydraulic cylinders (18B), and wherein the passive chamber (26A-2, 26B-2) is filled with fluid, wherein the fluid in the passive chamber (26A-2, 26B-2) exerts a force on the rear side of the piston (25A, 25B), which substantially corresponds to the force exerted by the pressure of the ambient air and thus influences the positions of the piston (25A, 25B) insignificantly, and further characterized by comprising a number of shock absorbers (36A,36B), wherein at least one respective shock absorber (36A,36B) is associated with a single-sided swing arm (12A,12B), wherein the shock absorbers (36A,36B) are respectively connected to the supporting vehicle element (14) and/or the single-sided swing arms (12A,12B) and further comprising a number of lever elements (38A,38B), wherein a lever element (38A, 38B) respectively associated with a single-sided swing arm (12A,12B) is pivotably attached to the supporting vehicle element (14), and whose sections are respectively connected to the shock absorber (36A,36B) and/or the hydraulic cylinder (18A,18B).

\* \* \* \* \*